(12) United States Patent
Su et al.

(10) Patent No.: US 6,404,427 B1
(45) Date of Patent: Jun. 11, 2002

(54) RAPID CHECKING METHOD FOR DETERMINING WHETHER AN OBJECT IS LOCATED WITHIN A FIELD OF VISION

(75) Inventors: Yuan-Liang Su; Der-Chin Pan, both of Taipei (TW)

(73) Assignee: Institute for Information Industry, Taipei (TW)

(*) Notice: Subject to any disclaimer, the term of this patent is extended or adjusted under 35 U.S.C. 154(b) by 0 days.

(21) Appl. No.: 09/340,318

(22) Filed: Jun. 25, 1999

(51) Int. Cl.[7] .............................................. G06T 15/00
(52) U.S. Cl. ...................................................... 345/419
(58) Field of Search ................................ 345/419, 748, 345/428, 420; 708/605

(56) References Cited

U.S. PATENT DOCUMENTS 5,379,371 A * 1/1995 Usami et al. ................ 395/128
5,945,992 A * 8/1999 Cunniff ....................... 345/335
6,070,181 A * 5/2000 Yeh ............................. 708/605

OTHER PUBLICATIONS

Foley et al., "Computer Graphics: Principles and Practice Second Edition in C" (1996), pp. 124–129, 274, 336–337 and 660–663.*

* cited by examiner

*Primary Examiner*—Mark Zimmerman
*Assistant Examiner*—Lance W. Sealey
(74) *Attorney, Agent, or Firm*—Ya-Chiao Chang, Esq

(57) ABSTRACT

A rapid checking method for determining whether an object is located within a field of vision is provided. A computer serves to process the states of a 3D image so as to determine whether the object is located within the field of vision. An efficient calculation process is used. In the invention, the 3D coordinates of eight vertexes of an object and the boundary box formed by equations of six planes are employed in operation. By determining the relationship of the vertexes and the planes, it is determined whether an object is within the field of vision.

3 Claims, 4 Drawing Sheets

RAPID CHECKING METHOD FOR DETERMINING WHETHER AN OBJECT IS LOCATED WITHIN A FIELD OF VISION

FIELD OF INVENTION

The invention is in the field of computer imaging particular, the invention relates to computer processing of three-dimensional (3D) animation, e.g., in a computer game.

BACKGROUND OF THE INVENTION

The general method of illustrating 3D animation is shown in FIG. 1. Referring to the figure, the 3D shapes of a plurality of objects are first stored in a database. Each object is defined in a coordinate system, referred to as a 3D-World coordinate system. According to the field of vision as seen by a viewer, a coordinate system of a 3D-Screen (field of vision) is determined. In Step P1, the 3D-World coordinate system is converted into a 3D-Screen (field of vision) coordinate system. Next, in Step P2, the 3D-Screen (field of vision) coordinate is projected onto a 2D-screen (field of vision) coordinate system. Finally, in Step P3, the figures of the object are plotted and shown in the field of vision. Current 3D engines, such as Open GL, serve to perform the function of Steps P1 to P3. However, the aforementioned process entails a large quantity of 3D plotting operations and complexities in a 3D engine. Therefore, before calculations performed by the 3D engine, it is desirable to first select the objects to be located in the field of vision. Data of the selected objects are then sent to the 3D engine for further operation.

Thus, there is a need in the art for a rapid checking method for determining whether an object is located within the field of vision.

SUMMARY OF THE INVENTION

Accordingly, an object of the invention is to provide a rapid checking method for determining whether an object is located within a field of vision, where the method can be implemented by a computer.

Another object of the invention is to provide a rapid checking method for determining whether an object is located within a field of vision, where an efficient calculation process is used.

A further object of the invention is to generate the data of the boundary box of each object by a computer without manual input, where the data of the boundary box are utilized by the method of the invention.

In order to attain the aforementioned objects, in determining whether an object is located with a field of vision, a computer serves to process the object database. First, the data of the boundary box of each object is calculated and stored. The boundary box is defined by eight vertexes and covers the whole corresponding object. Moreover, a plurality of vertexes describing the shape of the object is used in this process. Next, it is determined whether the boundary box is located within the frustum formed by a field of vision, which is enclosed by six planes.

The invention provides an efficient process, wherein if all of the eight vertexes are located outside any enclosing plane, then it is determined that the object is not within the visible range.

DETAILED DESCRIPTION

Figure 2:
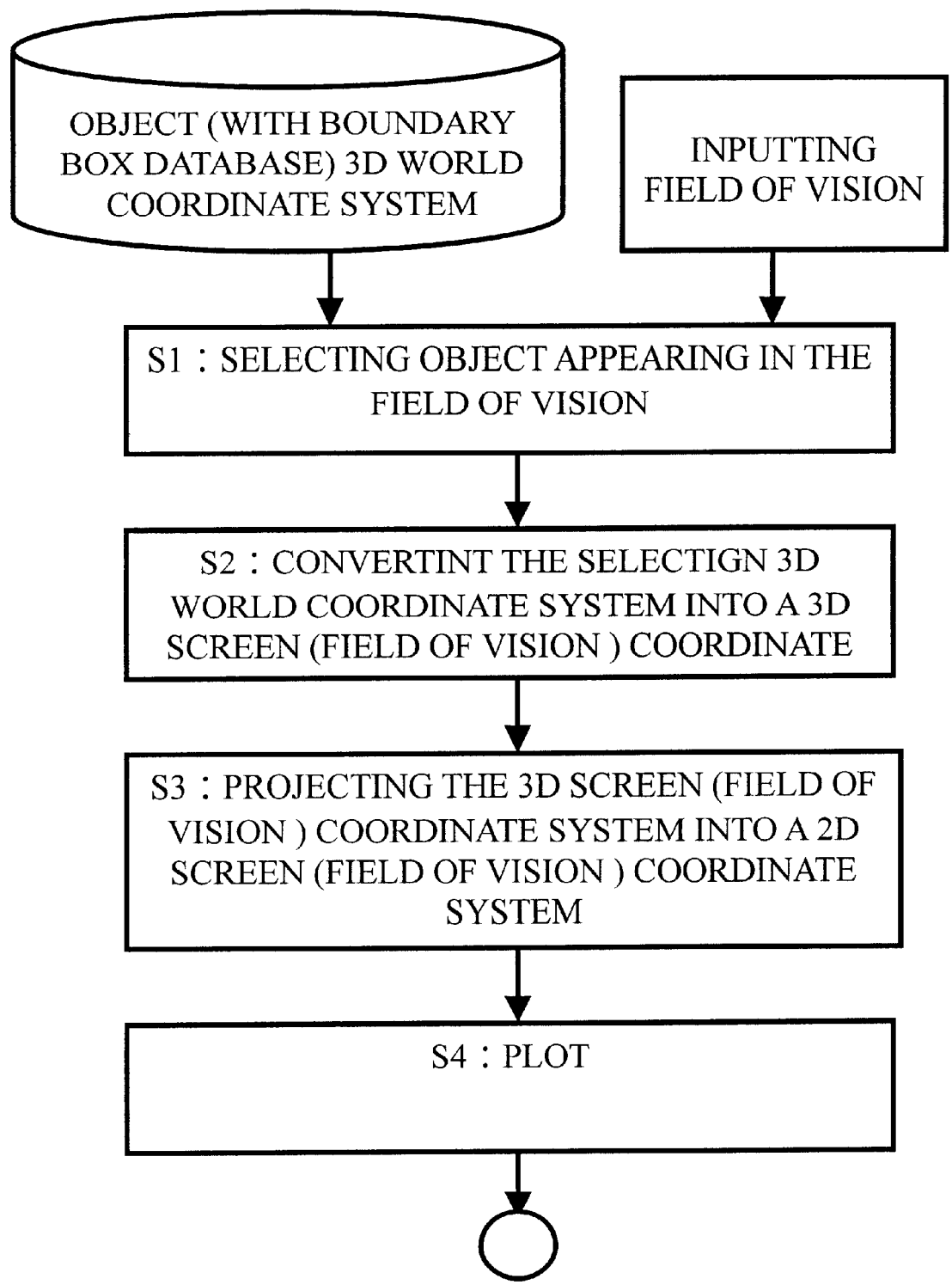
FIG. 2 shows a method of plotting 3D animation according to the invention.

With reference to FIG. 2, the plotting method of 3D animation according to the invention is illustrated.

Figure 3:
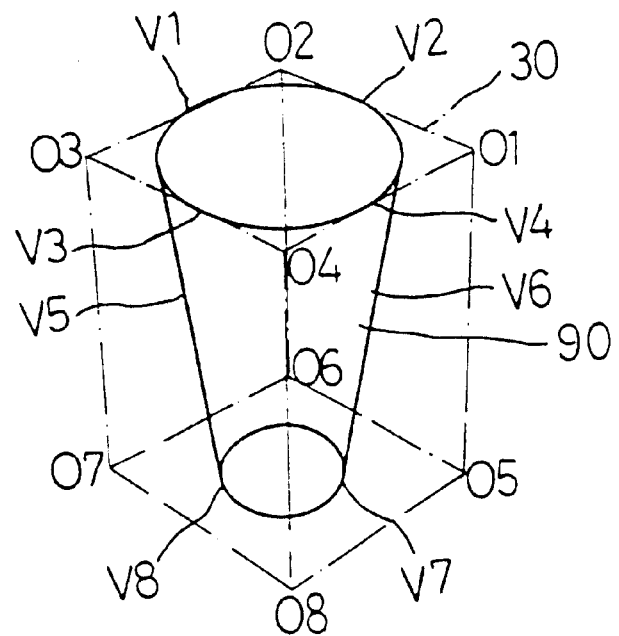
FIG. 3 is a schematic view for building a boundary box according to the invention.

The coordinate of an object is defined by X, Y and Z axes. Other than using 3D coordinates to present a plurality of objects, according to the invention, a boundary box is built for each object, as illustrated in the schematic of FIG. 3. For example, for an object 90 (such as a cup), the coverage of the boundary box is fully comprised of the object 90. The boundary box can be defined by vertexes O1, O2, O3, O4, O5, O6, O7 and O8. The coordinates of the eight vertexes are derived from the 3D-World coordinate system that is described by the plurality of vertexes (vertex, v1,v2 . . . ) instead of being defined by manually input coordinates. For example, one way for defining the coordinates of the eight vertexes according to the invention is described in the following:

MinX=Minimum X value in all vertexes of the object

MaxX=Maximum X value in all vertexes of the object

MinY=Minimum Y value in all vertexes of the object

MaxY=Maximum Y value in all vertexes of the object

MinZ=Minimum Z value in all vertexes of the object

MaxZ=Maximum Z value in all vertexes of the object

O1=(MinX, MinY, MinZ)

O2=(MinX, MinY, MaxZ)

O3=(MinX, MaxY, MinZ)

O4=(MinX, MaxY, MaxZ)

O5=(MaxX, MinY, MinZ)

O6=(MaxX, MinY, MaxZ)

O7=(MaxX, MaxY, MinZ)

O8=(MaxX, MaxY, MaxZ)

A software program can calculate the coordinates of the boundary box. The boundary box of each object 90 is accordingly constructed.

Figure 4:
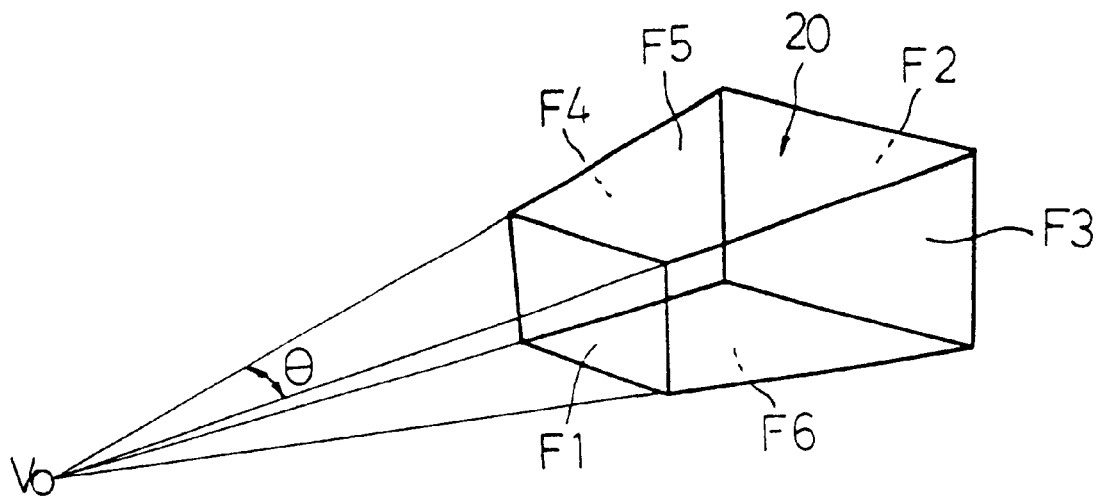
FIG. 4 is a schematic view illustrating a field of vision.

A schematic view of the field of vision 10 is illustrated in FIG. 4. V0 is the position of a viewer. F1 plane represents a nearest position for viewing an object. F2 plane represents the farthest position for viewing an object. Moreover, the right side plane F3, left side plane F4, upper side plane F5, and lower side plane F6 are included. The coverage of the field of vision is a frustum confined by six planes. While the equations (having a form of Ax+By+Cz=d) of the six planes are determined by the distance between the planes F1 and F2, the ratio of width to height of the F1 plane and angle of visionΘ.

Figure 1:
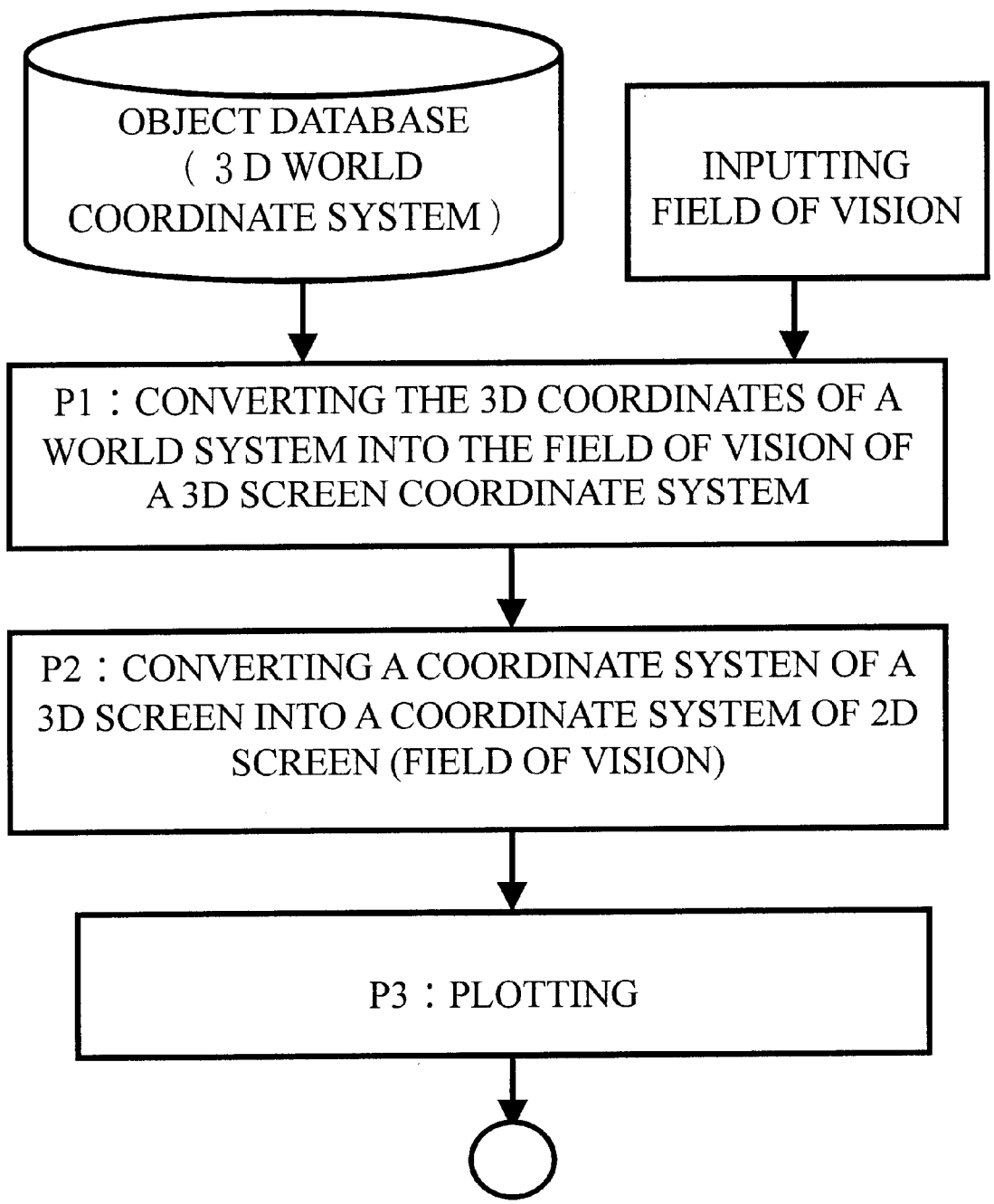
FIG. 1 shows a prior art method of plotting 3D animation.

In Step S1, in the field of vision as seen by a user, an object that appears in the field of vision is selected from the database containing boundary box data. Steps S2, S3 and S4 are similar to Steps P1–P4 of FIG. 1. The process of Step S1 is described below.

Figure 5:
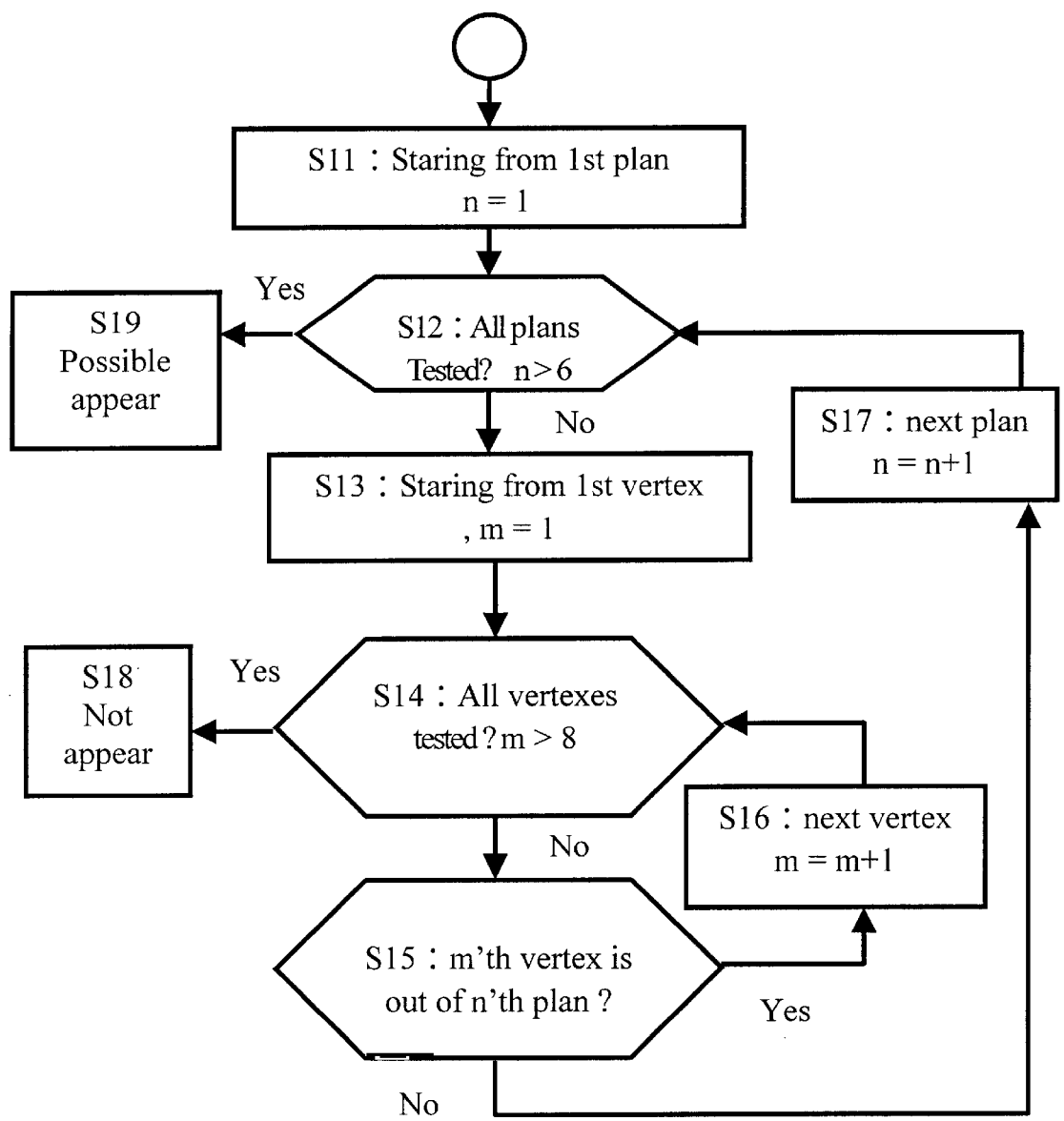
FIG. 5 shows a process for determining whether an object is located out of a field of vision.

FIG. 5 is a flow chart of an embodiment of the invention, showing an object being located within the field of vision. It is then determined whether any one of the eight vertexes is outside any enclosing plane (F1–F6). If so, then it is determined that the object is not in the field of vision. Since the method of the invention can be performed by a computer, the steps shown in FIG. 5 are described by illustrating the steps in a computer program, as follows:

Step S11: Starting with the first plane, set a counter n to 1, where n represents the n'th plane in current use.

Step S12: Determine whether all the planes have been tested, specifically, whether n>6. If no, Step S13 is performed. If so, the conclusion S19 is obtained, and the object is determined to be located in the field of vision.

Step S13: Starting with the first vertex, set a counter "m" to 1, where m represents the m'th vertex in current use.

Step S14: Determine whether all the vertexes have been tested, specifically, whether m>8. If no, the process of the invention continues to S15. If so, it is determined that the object is not located within the field of vision.

Step S15: Determine whether the m'th vertex is out of the n'th plane. If so, the process of the invention performs Step S16 to test the next vertex, while count m of the counter is incremented by one. If no, the process of the invention performs Step S17 to test the next plane, while count n of the counter is incremented by one.

It should be noted that the aforementioned embodiment is only one embodiment of the invention and serves to describe the invention, which does not confine the scope of the invention. For example, in that embodiment, it is only needed to determine whether any of the eight vertexes is located out of any enclosing plane; this is sufficient to determine the result. All modifications and variations are within the scope and spirit of the invention as confined by the appended claims.

What is claimed is:

1. A method for computer 3D (three-dimensional) animation comprising steps of:

selecting an object for visual viewing in a field of vision in the computer animation;

confining the field of vision by a frustum formed by six planes;

calculating three-dimensional (3-D) coordinates of eight vertexes in said object that form a boundary box covering said object; and determining whether all said eight vertexes are located outside of any one of said six planes, if it is determined that none of said eight vertexes is located outside of any one of said six planes, then performing the following steps (i), (ii), (iii) and (iv):

(i) determining that said object is in the field of vision (ii) converting the three-dimensional (3-D) coordinates into corresponding three-dimensional screen coordinates in the computer animation;

(iii) projecting the three-dimensional (3-D) screen coordinates into corresponding two-dimensional (2-D) screen coordinates in the computer animation; and (iv) plotting the two-dimensional (2-D) screen coordinates for visual viewing in the computer animation.

2. The method of claim 1 further comprising the steps of:

reading said three-dimensional (3-D) coordinates of said vertexes in said object;

finding a minimum X value (MinX), a maximum X value (MaxX), a minimum Y value (MinY), a maximum Y value (MaxY), a minimum Z value (MinZ), a maximum Z value (MaxZ) in all of said vertexes of the object; and setting the three-dimensional (3-D) coordinates of said vertexes respectively donated O1, O2, O3, O4, O5, O6, O7 and O8 to:

O1=(MinX, MinY, MinZ);
O2=(MinX, MinY, MaxZ);
O3=(MinX, MaxY, MinZ);
O4=(MinX, MaxY, MaxZ);
O5=(MaxX, MinY, MinZ);
O6=(MaxX, MinY, MaxZ);
O7=(MaxX, MaxY, MinZ); and
O8=(MaxX, MaxY, MaxZ).

3. A method for processing three-dimensional images onto a two-dimensional field of vision for visual viewing of a plurality of objects in a computer display, the method comprising the steps of:

(a) selecting an object out of the plurality of objects;

(b) constructing a boundary box covering the selected object;

(c) calculating three-dimensional coordinates of the boundary box;

(d) deriving a plurality of vertexes of the boundary box from the three-dimensional coordinates of the boundary box;

(e) confining the field of vision by a frustum formed with a plurality of planes;

(f) determining whether any one of the vertexes is outside the planes;

if it is determined in step (f) that none of the vertexes is outside the planes, (g) converting the three-dimensional (3-D) coordinates into corresponding three-dimensional screen coordinates in the display;

(h) projecting the three-dimensional (3-D) screen coordinates into corresponding two-dimensional (2-D) screen coordinates in the display; and (i) plotting the two-dimensional (2-D) screen coordinates for visual viewing in the display.

* * * * *